June 17, 1941.  R. T. CHEESEMAN  2,246,163
BATTERY CHARGING
Filed Jan. 4, 1939
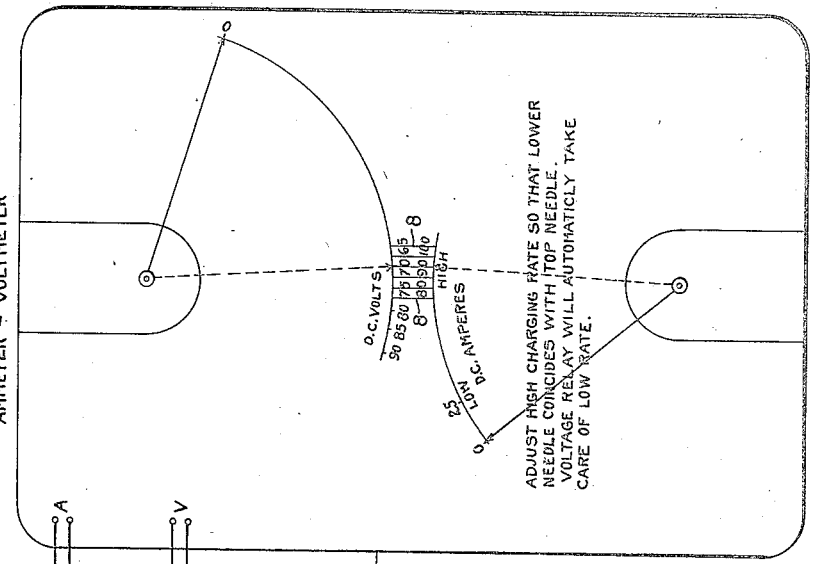
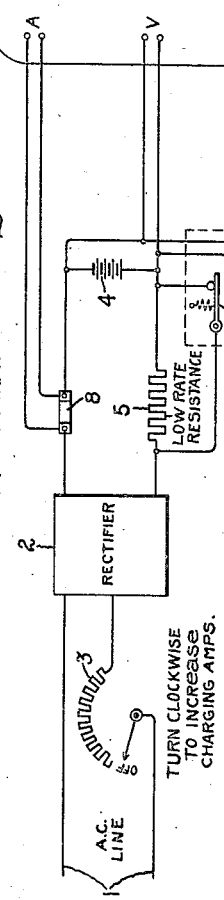
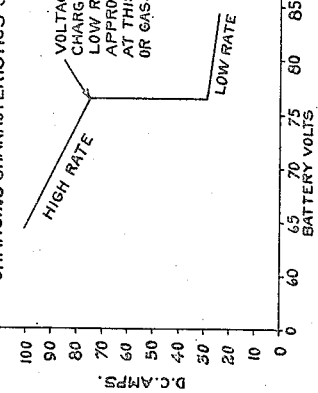
Inventor:
Ralph T. Cheeseman,
by Harry E. Dunham
His Attorney.

Patented June 17, 1941

2,246,163

UNITED STATES PATENT OFFICE 2,246,163

BATTERY CHARGING

Ralph T. Cheeseman, Lynn, Mass., assignor to General Electric Company, a corporation of New York Application January 4, 1939, Serial No. 249,277

6 Claims. (Cl. 171—95)

This invention relates to battery charging and more particularly to an instrument for facilitating the correct adjustment of the charging current of a storage battery.

A simple and well known way to charge a storage battery quickly from a substantially constant voltage source is to charge it at a predetermined relatively high rate until it is about ninety per cent charged and then reduce the charging rate to a relatively low finishing value so as not to overheat the battery. During the relatively high rate the battery voltage is increasing thus causing a "tapering" decrease in charging current. Consequently, at any given battery voltage there is a corresponding correct charging current and vice versa.

If a battery were always charged from the same source of constant voltage and if the impedance of the battery charging circuit were always constant, the circuit could readily be adjusted so as to charge the battery at the proper rate regardless of its state of charge. However, these ideal conditions are often not realized in practice. For example, some batteries and their chargers on Pullman cars are connected to power circuits in many different cities and the voltages of these circuits are often quite different. Furthermore, changes in ambient temperature cause changes in the impedance of the battery charging circuit. Another change in impedance is caused with time, as when copper-oxide charging rectifiers change their resistance as they age.

In accordance with this invention there is provided a novel and simple instrument whereby the battery charging circuit can be quickly and easily adjusted to provide the proper charging current for any state of charge of the battery, or any applied voltage or any impedance condition of the charging circuit.

An object of the invention is to provide a new and improved instrument for facilitating the adjustment of battery charging circuits.

The invention will be better understood by reference to the following description taken in connection with the accompanying drawing and its scope will be pointed out in the appended claims.

In the drawing Fig. 1 shows an embodiment of the invention connected to a diagrammatically illustrated battery charging system, and Fig. 2 shows the proper two-rate charging characteristics of a 32-cell lead storage battery.

Referring now to the drawing, there is shown therein an alternating current power circuit 1 connected to a rectifier 2 of any suitable type through an adjustable series impedance 3. This impedance may be of any suitable type such as a tapped reactor or an ordinary rheostat. The direct current output terminals of the rectifier are connected to a storage battery 4 through a low-rate-of-charge controlling resistor 5. This resistor is normally short circuited by the contacts of a voltage relay 6 connected across the battery. This relay is so set that it opens its contacts when the voltage of the battery reaches a point corresponding to approximately ninety per cent full charge of the battery.

For facilitating the proper setting of the series impedance 3 there is provided a combination instrument having a casing containing an ammeter and a voltmeter. The ammeter has terminals connected in the charging circuit by means of a shunt 8 and the voltmeter has terminals connected across the battery. Thus, the reading of the voltmeter indicates the state of charge of the battery, and the reading of the ammeter indicates the charging current of the battery. The voltmeter and ammeter scales are juxtaposed and corresponding points thereon are connected by lines 9 so as, in effect, to form a common scale for the two instruments.

In operation the impedance 3 is adjusted until the pointers or ends of the voltmeter and ammeter needles coincide. The battery will then be charged at the proper rate for its state of charge. This can more easily be seen by reference to Fig. 2. A substantially completely discharged 32-cell lead storage battery has a voltage of about 64 volts corresponding to about 2 volts per cell. At this voltage the proper charging current is approximately 100 amperes. The 100-ampere charging current flowing in the battery increases its state of charge. When the battery voltage has risen to about 2.4 volts per cell or 77 volts for the entire battery, the relay 6 operates to insert the resistance 5 in the charging circuit, thus reducing the charging rate from about 77 amperes to about 30 amperes. As has been stated above, this point corresponds to about ninety per cent full charge of the battery and the remaining ten per cent of the charge is put into the battery at the relatively low finishing rate. It will be noted that the points on the voltmeter and ammeter scales connected by the lines 9 correspond substantially to the coordinates of the points on the characteristic curve shown in Fig. 2.

By means of the instrument 7, the charging current of any battery charger may be quickly adjusted to the proper value for the particular state of the battery being charged so as to bring the battery up to ninety per cent of full charge as rapidly as possible without injury to the battery. Without the use of this instrument the battery may be charged at a lower rate than it can be charged, thus wasting time or it can be charged at a higher rate than the proper rate, thus subjecting the battery to injurious heating and gassing.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In a constant voltage taper charging system for storage batteries, an instrument for indicating the correct charging current of a storage battery for any particular state of charge thereof comprising, a meter for indicating the state of battery charge, a second meter for indicating the battery charging current, said meters having juxtaposed scales, and lines connecting points of the scale of the state-of-charge indicating meter with points on the scale of the charging-current indicating meter, said connected points corresponding substantially to the coordinates of points on a predetermined curve.

2. In a constant voltage taper charging system for storage batteries, an instrument for indicating the correct charging current of a storage battery for any particular state of charge thereof comprising, a casing, a meter for indicating the state of battery charge in terms of battery potential mounted therein, a second meter for indicating battery charging current mounted therein, said meters having pointers cooperating respectively with juxtaposed scales on a common scale-carrying member, and lines on said member connecting points on the scale of the state-of-charge indicating meter with points on the scale of the charging-current indicating meter, said connected points corresponding substantially to the coordinates of points on a predetermined battery charging characteristic curve.

3. In a constant voltage taper charging system for storage batteries, an instrument for indicating the correct charging current of a storage battery for any particular state of charge thereof comprising, a casing, a meter for indicating the state of battery charge in terms of battery potential mounted therein, a second meter for indicating battery charging current mounted therein, said meters having their respective pointers so arranged that they coincide when the correct relation exists between state of charge and charging current.

4. In a constant voltage taper charging system for storage batteries, an instrument for indicating the correct charging current of a storage battery for any particular state of charge thereof comprising, a casing, a meter for indicating the state of battery charge in terms of battery potential mounted therein, a second meter for indicating battery charging current mounted therein, said meters having a common scale for their respective pointers so arranged that when said pointers coincide the correct relation exists between rate of charge and charging current.

5. In a constant voltage taper charging system for storage batteries, an instrument for indicating the correct charging current of a storage battery for any particular state of charge thereof comprising, a meter having a movable element whose position indicates the state of battery charge, and a second meter having a movable element whose position indicates the battery charging current, said meters being so arranged that the positions of said elements correspond with each other when the correct battery charging current flows in the battery for its particular state of charge.

6. In a battery charger which is selectively connectible to different constant voltage supply circuits having different voltage levels and which provides a manually adjustable initial relatively high rate taper charge, an indicator for facilitating the proper adjustment of said charging rate for any particular supply circuit voltage level and any particular state of battery charge comprising, in combination, a battery voltage responsive voltmeter and a battery charging current responsive ammeter, the pointer reading of said voltmeter increasing as charging progresses and the pointer reading of said ammeter decreasing as charging progresses, and means for so correlating the oppositely varying readings of said meters that the pointers are in effective registration when the battery charging current is correct for the then existing battery voltage whereby charging will be completed in the minimum safe time for any particular supply circuit voltage level and initial state of battery charge.

RALPH T. CHEESEMAN.